United States Patent
Suzuki et al.

(10) Patent No.: US 8,374,320 B2
(45) Date of Patent: Feb. 12, 2013

(54) ENVIRONMENT INFORMATION TRANSMISSION METHOD, SERVICE CONTROLLING SYSTEM, AND COMPUTER PRODUCT

(75) Inventors: Masato Suzuki, Kawasaki (JP); Akihiro Inomata, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1011 days.

(21) Appl. No.: 11/416,095

(22) Filed: May 3, 2006

(65) Prior Publication Data
US 2007/0061891 A1    Mar. 15, 2007

(30) Foreign Application Priority Data
Sep. 1, 2005   (JP) ................................ 2005-253994

(51) Int. Cl.
*H04M 11/00*  (2006.01)
*G06F 21/00*  (2006.01)
(52) U.S. Cl. ........................ 379/93.02; 705/52; 705/59
(58) Field of Classification Search ............. 379/93.02, 379/142.05–142.06; 340/825, 3.1, 825.22, 340/3.4; 705/32, 59, 52
See application file for complete search history.

(56) References Cited

U.S. PATENT DOCUMENTS

| | | | |
|---|---|---|---|
| 6,204,774 B1* | 3/2001 | Miwa et al. | 340/5.2 |
| 7,287,010 B1* | 10/2007 | Ishibashi | 705/52 |
| 7,353,541 B1* | 4/2008 | Ishibashi et al. | 726/26 |
| 7,549,062 B2* | 6/2009 | Kouznetsov et al. | 713/193 |
| 2002/0091645 A1* | 7/2002 | Tohyama | 705/59 |
| 2002/0174167 A1 | 11/2002 | Kitazawa et al. | |
| 2003/0028454 A1* | 2/2003 | Ooho et al. | 705/32 |
| 2004/0031030 A1* | 2/2004 | Kidder et al. | 717/172 |
| 2004/0133803 A1* | 7/2004 | Rabin et al. | 713/200 |
| 2004/0139316 A1 | 7/2004 | Kotani | |
| 2006/0143452 A1* | 6/2006 | Numao et al. | 713/168 |
| 2008/0147850 A1* | 6/2008 | Schuschan | 709/224 |
| 2010/0017859 A1* | 1/2010 | Kelly et al. | 726/5 |
| 2010/0312657 A1* | 12/2010 | Coulter et al. | 705/16 |
| 2010/0333186 A1* | 12/2010 | Chan et al. | 726/10 |

FOREIGN PATENT DOCUMENTS

| | | |
|---|---|---|
| JP | 2003-036242 A | 2/2003 |
| JP | 2004-157790 | 6/2004 |

OTHER PUBLICATIONS

"Japanese Office Action" mailed by JPO and corresponding to Japanese application No. 2005-253994 on May 10, 2011, with English translation.

* cited by examiner

*Primary Examiner* — Mohammad Islam
(74) *Attorney, Agent, or Firm* — Fujitsu Patent Center

(57) ABSTRACT

When changes occur in an environment of the service user terminal, a network operator terminal acquires hashed environment information indicative of the changes from the service user terminal. The network operator terminal sends the hashed environment information to an environment management authority terminal. The environment management authority terminal calculates an evaluation value based on the hashed environment information and transmits the evaluation value to a network operator terminal. The network operator terminal transmits status change information to the service provider terminal. The service provider terminal updates information about the user information previously stored and decides whether to provide the service to the service user terminal based on the updated information.

11 Claims, 13 Drawing Sheets

FIG.3

EVALUATION DB
15a

| ENVIRONMENT INFORMATION OF VENDOR PRODUCT (VENDOR NAME, PRODUCT NAME, VERSION ETC.) | ENVIRONMENT INFORMATION SUBJECTED TO HASHING | EVALUATION VALUE | | |
|---|---|---|---|---|
| | | SECURITY | PERFORMANCE | ... |
| COMPANY A, OS-A, version 2002, ... | (HASH VALUE OF ENVIRONMENT INFORMATION) | 90 | 70 | ... |
| COMPANY A, OS-A, version 2000, ... | (HASH VALUE OF ENVIRONMENT INFORMATION) | 80 | 70 | ... |
| COMPANY B, CPU-B, version 95, ... | (HASH VALUE OF ENVIRONMENT INFORMATION) | 80 | 90 | ... |
| COMPANY C, MEMORY-C, version 5, ... | (HASH VALUE OF ENVIRONMENT INFORMATION) | 80 | 60 | ... |
| ⋮ | ⋮ | ⋮ | ⋮ | ⋮ |

FIG.4

USER DB
25a

| USER ID | USER NAME | DATE AND TIME OF UPDATE | EVALUATION VALUE |
|---|---|---|---|
| U0001 | ○○○○ | 2000/8/31 | SECURITY: 90<br>PERFORMANCE: 90 |
| U0002 | △△△△ | 2001/10/3 | SECURITY: 70<br>PERFORMANCE: 90 |
| ⋮ | ⋮ | ⋮ | ⋮ |

FIG.5

SERVICE DB
25b

| SERVICE ID | SERVICE NAME (VIDEO CONTENT NAME) | CONTENT DATA |
|---|---|---|
| S0001 | ○○○ | (DATA FOR 56 k) (DATA FOR 200 k) |
| S0002 | △△△ | (DATA FOR 200 k) |
| S0003 | ××× | (DATA FOR 56 k) (DATA FOR 200 k) |
| ⋮ | ⋮ | ⋮ |

FIG.6

SERVICE POLICY DB
25c

| SERVICE ID | CONDITION FOR PROVIDING SERVICE |
|---|---|
| S0001 | SECURITY: NOT LESS THAN 90 PERFORMANCE: NOT LESS THAN 80 |
| S0002 | SECURITY: NOT LESS THAN 80 |
| S0003 | SECURITY: NOT LESS THAN 70 PERFORMANCE: NOT LESS THAN 80 |
| ⋮ | ⋮ |

FIG.7

SERVICE HISTORY DB
25d

| USER ID | USER NAME | SERVICE HISTORY ||||
|---------|-----------|---------------|------------|------------------|-----------------|
|         |           | DATE AND TIME | SERVICE ID | EVALUATION VALUE | CONTROL CONTENT |
| U0001 | ○○○○ | 050301/2200 | S0001 | SECURITY: 90 PERFORMANCE: 90 | TRANSMIT DATA FOR 200 k |
| U0002 | △△△△ | 050301/2300 | S0002 | SECURITY: 70 PERFORMANCE: 90 | REJECT DATA TRANSMISSION |
| ⋮ | ⋮ | ⋮ | ⋮ | ⋮ | ⋮ |

FIG.8

ENVIRONMENT INFORMATION MANAGEMENT DB
35a

| USER ID | HASHED ENVIRONMENT INFORMATION | EVALUATION VALUE |
|---------|--------------------------------|------------------|
| U0001 | (HASH VALUE OF ENVIRONMENT INFORMATION) | SECURITY: 90 PERFORMANCE: 90 |
| U0002 | (HASH VALUE OF ENVIRONMENT INFORMATION) | SECURITY: 70 PERFORMANCE: 90 |
| ⋮ | ⋮ | ⋮ |

ENVIRONMENT INFORMATION TRANSMISSION METHOD, SERVICE CONTROLLING SYSTEM, AND COMPUTER PRODUCT

BACKGROUND OF THE INVENTION

1. Field of the Invention

The present invention relates to transmitting environment information of a terminal to a controlling unit that controls as to whether or not to provide a service to the terminal.

2. Description of the Related Art

It has become common to provide a service from a terminal of a service provider to a terminal of a user via a network. To ensure the security of the service, before providing the service, the environment of the user terminal is checked. The environment information includes information regarding the softwares installed in the terminal such as the operating system (OS), the basic input-output system (BIOS), the browser, the plug-in softwares, and the hardware included into or attached to the terminal, such as the CPU, the memory, and the PCI board.

Japanese Patent Application Laid-open Publication No. 2004-157790 discloses a technology to reject providing a service to the user terminal the user for which the security cannot be ensured. Whether the security can be ensured is decided based on environment information acquired from the user terminal. For example, when the environment information indicates that a software with security holes has been installed in the user terminal, it is decided that the can not be ensured.

Thus, the conventional technology makes use of the environment information of the user terminal to decide whether to provide service. However, some users are reluctant to disclose the environment information of their terminal to the service provider.

Moreover, the environment information of terminals keeps on changing every moment. Therefore, to improve the reliability, the service provider needs to check the environment information each time before providing the service. However, it is time consuming and inefficient to check the environment information each time before providing the service.

SUMMARY OF THE INVENTION

It is an object of the present invention to at least solve the problems in the conventional technology.

According to an aspect of the present invention, in a method of controlling with a control terminal whether to provide a service to a user terminal from a provider terminal, the control terminal performs acquiring user information indicative of changes in the environment of the user terminal; and transmitting the user information to the provider terminal whereby the provider terminal decides based on the user information whether to provide the service to the user terminal.

According to another aspect of the present invention, in a service controlling system including a user terminal, a provider terminal, and a control terminal, wherein the control terminal controls whether to provide a service to a user terminal from a provider terminal, the control terminal includes an acquiring unit that acquires user information indicative of changes in the environment of the user terminal; a calculating unit that calculates a user evaluation value based on the user information; and a controlling unit that controls provision of the service to the user terminal from the provider terminal based on the user evaluation value.

According to still another aspect of the present invention, a computer-readable recording medium stores therein a computer program that implements a method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram of an example of a data structure of an evaluation database shown in FIG. 2;

FIG. 4 is a diagram of an example of a data structure of a user database shown in FIG. 2;

FIG. 5 is a diagram of an example of a data structure of a service database shown in FIG. 2;

FIG. 6 is a diagram of an example of a data structure of a service policy database shown in FIG. 2;

FIG. 7 is a diagram of an example of a data structure of a service history database shown in FIG. 2;

FIG. 8 is a diagram of an example of a data structure of an environment information management database shown in FIG. 2;

DETAILED DESCRIPTION OF THE PREFERRED EMBODIMENTS

Exemplary embodiments of the present invention are described below in detail with reference to the accompanying diagrams.

Figure 1:
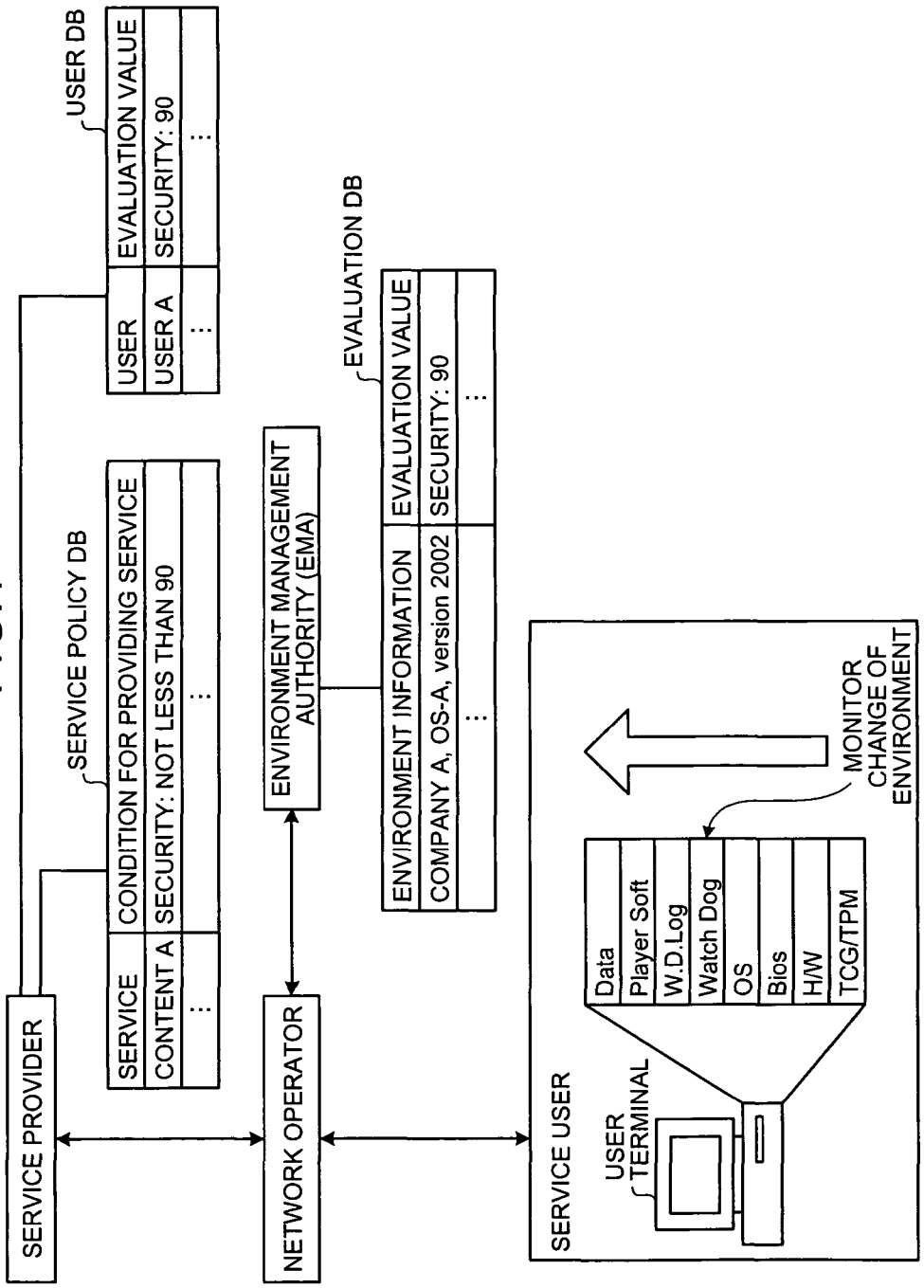
FIG. 1 is a schematic for explaining a concept of a service controlling system according to an embodiment of the present invention.

FIG. 1 is a schematic for explaining the concept of the service controlling system according to an embodiment of the present invention. The service controlling system controls the service provided from a service provider terminal to a service user terminal via a network.

The service includes, for example, distribution of movies and/or music. The service controlling system provides the service depending on the environment of the service user terminal. For example, the service controlling system does not provide contents to a service user terminal in which an unsafe hardware and/or software is installed.

The service controlling system, however, does not acquire the environment information from the user terminal. Therefore, users can enjoy the services without disclosing the environment information of their terminals.

A network operator is connected to both the service provider terminal and the service user terminal. The network operator is, for example, an ISP (Interface Segregation Principle) operator). An Environment Management Authority (EMA), which is a third party organization, controls provision of the service from the service provider terminal to the user terminal at the network operator.

The Environment Management Authority manages the environment information of the service user terminal. The Environment Management Authority obtains environment information from equipment vendors, calculates an evaluation value from a point of view of security and performance based on a susceptibility and performance of the software and the hardware, and stores the evaluation value and the environment information in associated manner in a database. For example, the Environment Management Authority manages an evaluation database (DB) in which environment information and evaluation values are associated in a manner such as "an OS-A (version 2002) of a company A=security evaluation value 90 points and performance evaluation value 70 points=an OS-B (version 2002) of the company A=security evaluation value 90 points and performance evaluation value 70 points".

On the service provider side, an evaluation value required for providing each content is controlled as a condition for providing the service, associated with the service (content). In other words, for example, monitor of the service provider manages a service policy DB in which each service and the condition for providing service are associated in a manner such as "condition for providing content A=security evaluation value not less than 90 points and performance evaluation value not less than 90 points and condition for providing content B=security evaluation value not less than 70 points and performance evaluation value not less than 90 points".

Moreover, the service provider terminal manages a user DB in which information for identifying the service user terminal and an evaluation value associated with the terminal. When the service provider terminal receives a request for a service from user terminal, the service provider terminal makes a judgment of whether or not it is possible to provide the service, based on the user DB and the service policy DB, and performs the service control such as providing the content or rejecting the service.

The user DB managed by the service provider is updated according to a change in the environment associated with the service user terminal. To describe in brief about the updating of the user DB, the service user terminal includes a processing section (such as Watch Dog Software) monitoring all the time the environment of the terminal, that detects the change in the environment from the service user terminal.

When the service user terminal detects a change in the environment associated with the terminal, the service user terminal transmits environment information of the environment changed to the Environment Management Authority and gets an evaluation value calculated. Further, the service provider terminal acquires information for identifying the service user from the Environment Management Authority and a new evaluation value associated with user terminal, and updates the user DB.

Thus, when the service user terminal detects a change in the environment of the terminal, the service provider terminal updates the user DB. Therefore, the service controlling system according to the embodiment can deal with the ever changing environment of the user terminal and it is possible to improve rapidly the reliability of providing the service.

Figure 2:
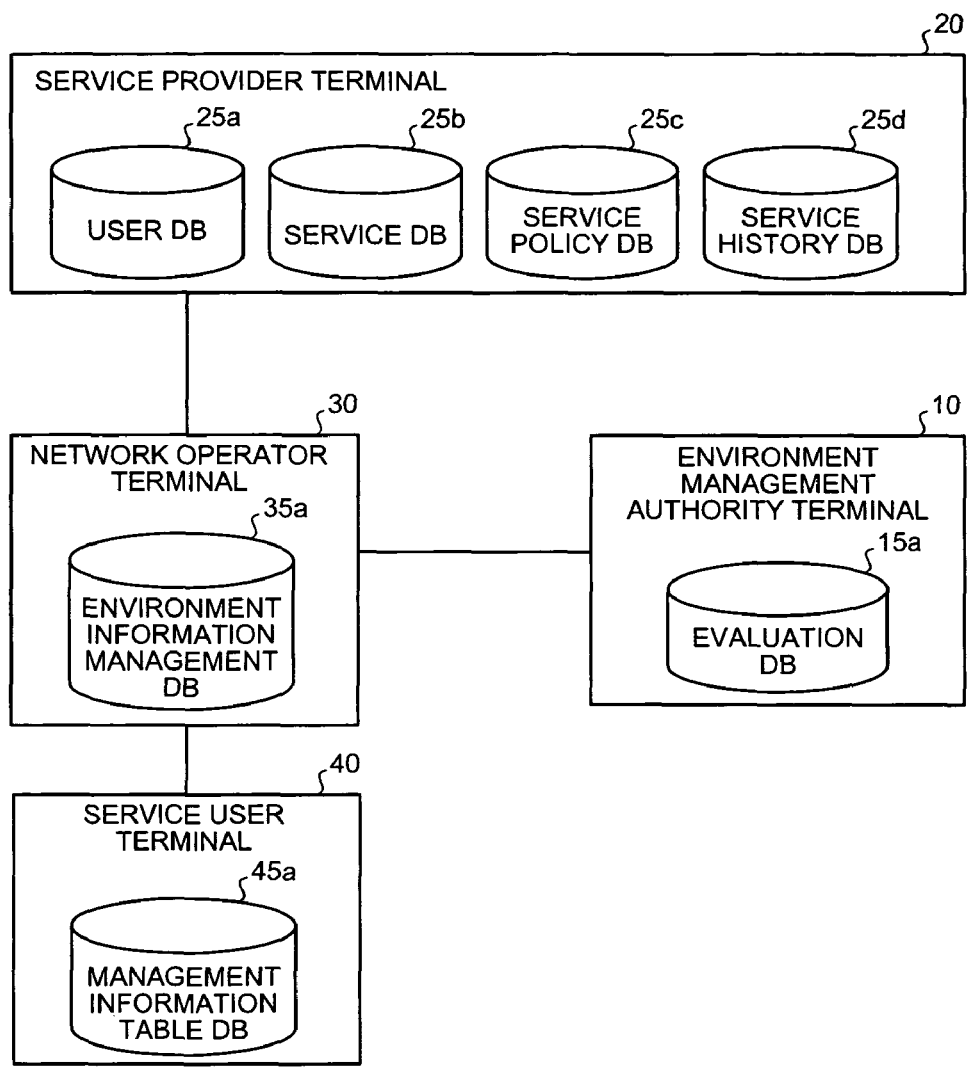
FIG. 2 is a block diagram of the service controlling system according to the embodiment.

FIG. 2 is a block diagram of the service controlling system. The service controlling system includes an environment management authority terminal 10, a service provider terminal 20, a network operator terminal 30, and a service user terminal 40. The environment management authority terminal 10 is connected to the network operator terminal 30. The service provider terminal 20 and the service user terminal 40 are connected to each other via the network operator terminal 30. The terminals are connected via a network, such as the Internet, LAN (local area network), or public telephone network.

The environment management authority terminal 10 is a server computer of the Environment Management Authority and manages an evaluation DB 15a. FIG. 3 is a diagram of an example of a data structure of the evaluation DB 15a. The evaluation DB 15a stores upon associating environment information of vendor products, environment information subjected to hashing, and the evaluation value.

Out of the environment information of vendor products, the environment information subjected to hashing, and the evaluation value, the "environment information" and the "environment information subjected to hashing" are registered in the evaluation DB 15a whenever information of the software and the hardware that may be incorporated in the service user terminal is obtained from the equipment vendor. Moreover, the "evaluation value" is determined from a point of view of the security and performance based on the susceptibility and the performance of the vendor product, when the vendor product is procured and is registered upon associating with the "environment information" and the "environment information subject to hashing".

Furthermore, when a new susceptibility (security hole) is discovered afterwards or when a high performance product is invented later, the "evaluation value" thus registered is reviewed and registered upon updating. In the embodiment, there are two "evaluation values" viz. a "security evaluation value" that is determined from a security point of view based on the susceptibility of the vendor product and a "performance evaluation value" that is determined from a performance point of view based on a capability of the vendor product.

The service provider terminal 20 is a server computer of the service provider and it manages a user DB 25a, a service DB 25b, a service policy DB 25c, and a service history DB 25d. FIG. 4 is a diagram of an example of a data structure of the user DB 25a. The user DB 25a records upon associating an evaluation value of the service user terminal, date and time of update, a user name, and user ID for identifying the user uniquely.

FIG. 5 is a diagram of an example of a data structure of the service DB 25b. The service DB 25b, stores upon associating content data, service name (video content name), and service ID for identifying uniquely each content, for each service (content). Even though the content data, as shown in FIG. 5, has the same content, the content data includes data of high image quality that is suitable for providing to a high performance service user terminal 40 and data of low image quality that is suitable for providing to a low performance service user terminal 40.

FIG. 6 is a diagram of an example of a data structure of the service policy DB 25c. The service policy DB 25c stores upon associating a condition for providing a service (evaluation value required for providing each content), and service ID of each content (service). Depending on as to how to set the "evaluation value" as the condition for providing a service, it is possible to realize a service control in which the content is provided only to a terminal for which evaluation points are not low (such as a terminal which is not susceptible and a terminal which is not a low performance terminal).

FIG. 7 is a diagram of an example of a data structure of the service history DB 25d. The service history DB 25d, for each service user, stores upon associating service history (date and time of service control, service ID, evaluation value used for service control, and result of realizing service control), user name, and user ID for identifying uniquely the service user.

The network operator terminal 30 is a server computer of the network operator and it manages an environment information management DB 35a. FIG. 8 is a diagram of an example of a data structure of the environment information management DB 35a. The environment information management DB 35a stores upon associating the evaluation value, the environment information subjected to hashing, and the user ID for identifying uniquely the user. The environment information management DB 35a is a database that stores temporarily information to be transmitted from each of the terminal 10, 20, or 40.

The service user terminal 40 is a terminal of a user having a communications function. The service user terminal 40 can be a personal computer or a work station, a household game machine, the Internet TV (television), a PDA (personal digital assistance), or a mobile telephone, and a PHS (personal handyphone system). The service user terminal 40 manages a management information table DB 45a.

Figure 9:
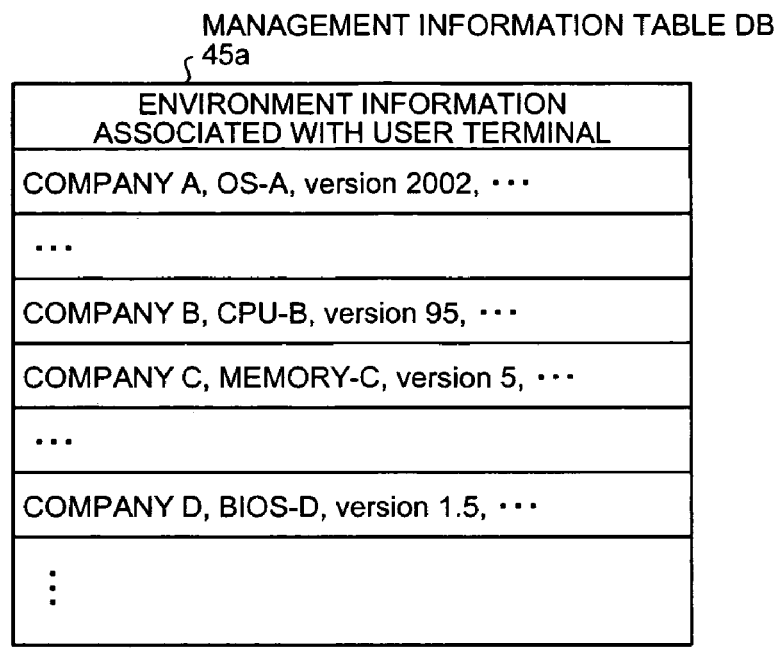
FIG. 9 is a diagram of an example of a data structure of a management information table database shown in FIG. 2.

FIG. 9 is a diagram of an example of a data structure of a management information table DB 45a. The management information table DB 45a stores the environment information of software (such as OS, BIOS, browser, and a plug in software) and hardware (such as a CPU, a memory, and a PCI board) incorporated in the service user terminal 40, and the hardware that is connected to the service user terminal 40. The environment information is gathered and registered in the management information table DB 45a by the service user terminal 40 at a time of start up of the service user terminal 40 as well as in a case where a software is newly installed or a hardware is newly connected after the start up (when the environment is changed), the environment information is gathered and registered in the management information table DB 45a by the service user terminal 40.

Figure 10:
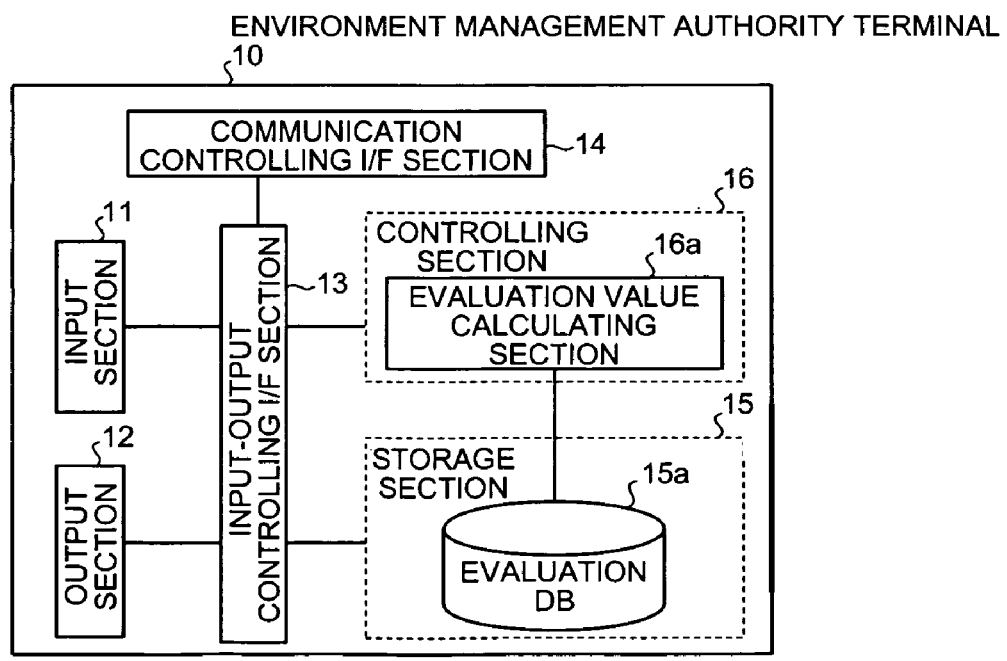
FIG. 10 is a block diagram of an environment management authority terminal shown in FIG. 2.

FIG. 10 is a block diagram of the environment management authority terminal 10. The environment management authority terminal 10 includes an input section 11, an output section 12, an input-output controlling I/F section 13, a communication controlling I/F section 14, a storage section 15, and a controlling section 16.

The input section 11 is a means for inputting information, and it can be a key board, a mouse, or a microphone. An operator operates the input section 11 to input the information to be stored in the evaluation DB 15a. A display device with a touch input function can be used as the input section 11.

The output section 12 is a means for outputting information and it can be a display device or a speaker. The output section 12 displays or reads the information that is stored in the evaluation DB 15a. The input-output controlling I/F section 13 is a unit for controlling an input and output of data to and from the input section 11 and the output section 12. The communication controlling I/F section 14 controls a communication mainly with the network operator terminal 30.

The storage section 15 stores data and computer programs necessary for various processing by the controlling section 16, and in particular, includes the evaluation DB 15a. The evaluation DB 15a is a storage unit for storing evaluation values of vendor products that may be incorporated in the service user terminal 40 (refer to FIG. 3).

The controlling section 16 includes an internal memory for storing a program and control data in which a processing procedure of each process is prescribed, and performs various processes accordingly. In particular, the controlling section 16 includes an evaluation value calculating section 16a as shown in FIG. 10.

The evaluation value calculating section 16a is a processing section that evaluates the environment associated with the service user terminal 40 and calculates the evaluation value. Concretely, when the evaluation value calculating section 16a receives from the network operator terminal 30 a request for evaluation of the environment information that is hashed, the evaluation value calculating section 16a calculates the evaluation value by reading from the evaluation DB 15a an evaluation value corresponding to the hashed information included in the request.

Figure 11:
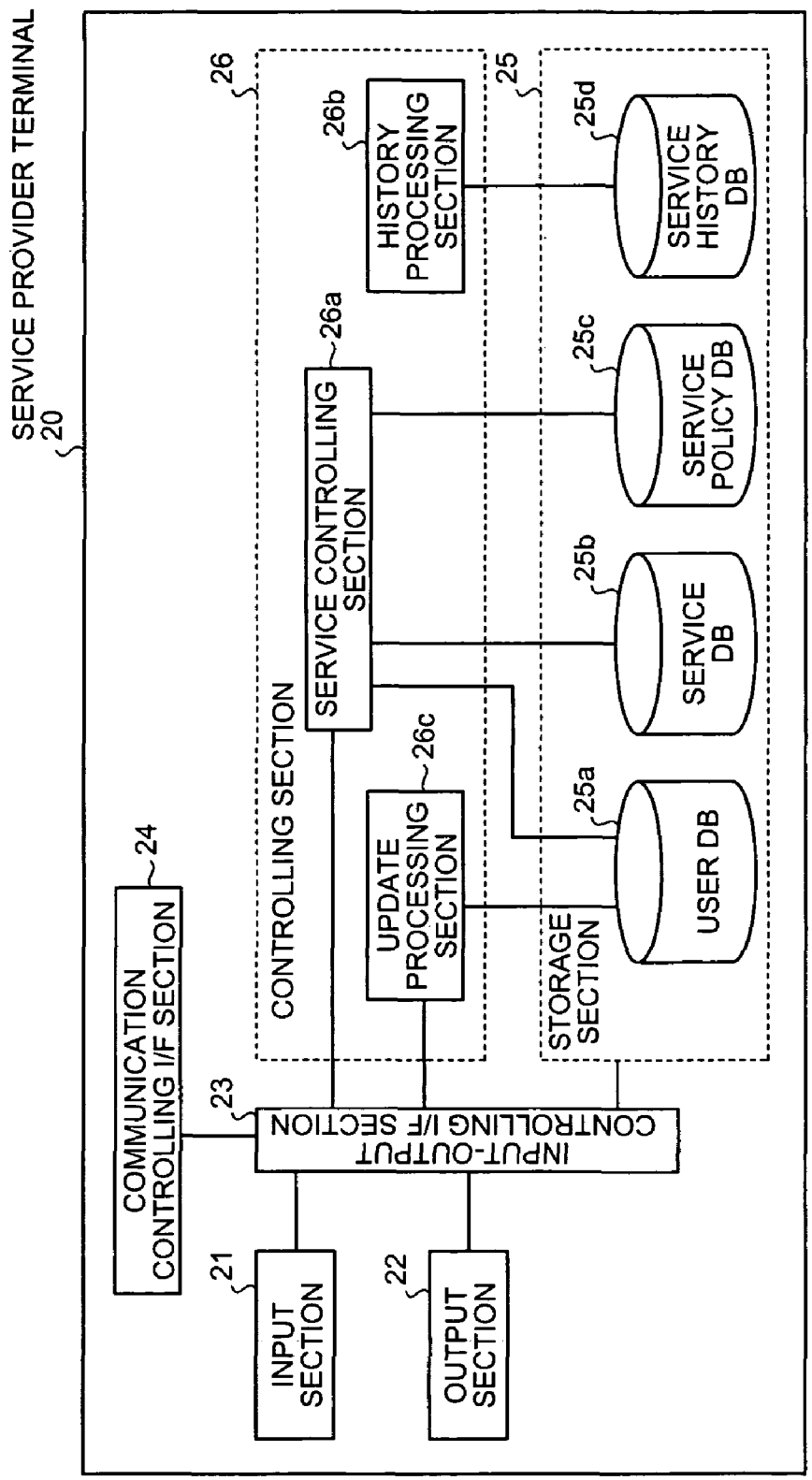
FIG. 11 is a block diagram of a service provider terminal shown in FIG. 2.

FIG. 11 is a block diagram of the service provider terminal 20. The service provider terminal 20 includes an input section 21, an output section 22, an input-output controlling I/F section 23, a communication controlling I/F section 24, a storage section 25, and a controlling section 26.

The input section 21 is a means for inputting information and it can be a key board, a mouse, or a microphone. The input section 21 receives information stored in the service DB 25b and the service policy DB 25c from the service provider. A monitor (the output section 22) that is described later, as well, realizes a function of the pointing device in cooperation with the mouse.

The output section 22 is a means for outputting information and includes a monitor (or a display and a touch panel) and a speaker. The output section 22, for example, outputs information that is stored in the user DB 25a, the service DB 25b, the service policy DB 25c, and the service history DB 25d. The input-output controlling I/F section 23 is a unit for controlling an input and an output of data to and from the input section 21 and the output section 22. The communication controlling I/F section 24 is a unit for controlling the communication mainly with the network operator terminal 30.

The storage section 25 stores data and program necessary for various processing by the controlling section 26, and in particular, includes the user DB 25a, the service DB 25b, the service policy DB 25c, and the service history DB 25d as shown in FIG. 11, as data associated closely with the present invention. The user DB 25a is a storage unit that stores information associated with the evaluation value of the service user terminal (refer to FIG. 4). The service DB 25b is a storage unit that stores information of a service provided by the service provider (refer to FIG. 5). The service policy DB 25c is a storage unit that stores a policy associated with providing the service (refer to FIG. 6). The service history DB 25d is a storage unit that stores information of the service user (refer to FIG. 7).

The controlling section 26 includes an internal memory for storing computer programs and control data in which a processing procedure of each process is prescribed, and performs various processes accordingly. In particular, the controlling section 26 includes a service controlling section 26a, a history processing section 26b, and an update processing section 26c as shown in FIG. 11.

When the service controlling section 26a receives from the service user terminal 40 a request for a service, the service controlling section 26a refers to the user DB 25a and the service policy DB 25C and makes a judgment of as to whether or not the evaluation value of the service user terminal 40 that made a request fulfils a condition for providing a service corresponding to the service for which the request is made, an then controls the service to be provided to the service user terminal 40.

The history processing section 26b is a processing section for processing a history of the service to be provided to the service user. Concretely, after the service control is performed by the service controlling section 26a, the history processing section 26b registers in the service history DB 25d a service history that includes a date and time of the service, a service ID, an evaluation value used for the service control and the result of performing the service control, upon associating with a user ID and a user name of the service user who made the request for the service.

The update processing section 26c is a processing section for updating information corresponding to the user DB 25a when status change information is acquired from the network operator terminal 30. The status change information includes a user ID and an evaluation value associated with the service user terminal and the update processing section 26, based on the user ID included in the status change information, registers an evaluation value that is recorded in the user DB 25a and that corresponds to the user ID. The update processing section 26c also makes a correction in date and time of update of the user DB 25a.

Figure 12:
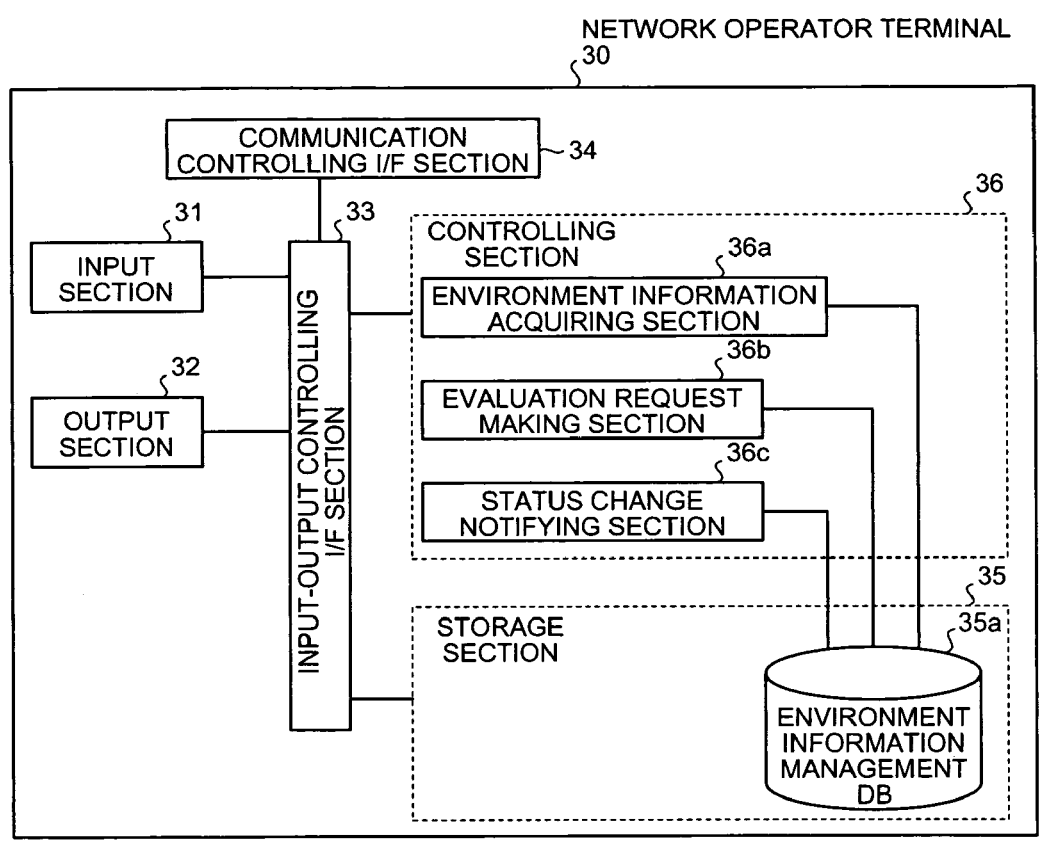
FIG. 12 is a block diagram of a network operator terminal shown in FIG. 2.

FIG. 12 is a block diagram of the network operator terminal 30. The network operator terminal 30 includes an input section 31, an output section 32, an input-output controlling I/F section 33, a communication controlling I/F section 34, a storage section 35, and a controlling section 36.

The input section 31 is a means for inputting information and includes a key board, a mouse, and a microphone. A monitor (the output section 32) that is described later, as well, realizes the function of the pointing device in cooperation with the mouse.

The output section 32 is a means for outputting information and includes a monitor (or a display and a touch panel) and a speaker. The output section 32 outputs the environment information management DB 35a. The input-output controlling I/F section 33 is a controlling unit that controls an input and an output of data to and from the input section 31 and the output section 32. The communication controlling I/F section 34 is a unit for controlling the communication mainly with the environment management authority terminal 10, and the service provider terminal 20, and the service user terminal 40.

The storage section 35 stores data and program necessary for various processing by the controlling section 36, and in particular, as shown in FIG. 12, the environment information management DB 35a is a storage unit that stores temporarily the hashed environment information that is transmitted from the service user terminal 40 and the evaluation value corresponding to the environment information (refer to FIG. 8).

The controlling section 36 includes an internal memory for storing a program and control data in which a processing procedure of each process is prescribed, and performs various processes accordingly. In particular, the controlling section 36 includes an environment information acquiring section 36a, an evaluation request making section 36b, and a status change notifying section 36c.

The environment information acquiring section 36a makes a request to the service user terminal 40 at regular intervals of time for the hashed environment information (environment information associated with the environment changed of the service user terminal 40), and when acquires the environment information (in other words, when the environment of the service user terminal 40 is changed), the environment information acquiring section 36a associates the environment information acquired with the user ID and registers in the environment information management DB 35a.

Moreover, the environment information acquiring section 36a, when acquires asynchronously the hashed environment information from the service user terminal 40, the environment information acquiring section 36a associates the environment information acquired with the user ID and registers in the environment information management DB 35a.

The evaluation request making section 36b is a processing section that transmits environment information to the environment management authority terminal 10 when the environment information acquiring section 36a acquires the environment information, and makes a request for calculation of the evaluation value. The evaluation request making section 36b, when acquires the evaluation value corresponding to the environment information from the environment management authority terminal 10, associates the evaluation value acquired and the environment information, and records in the environment information management DB 35a.

When the user ID, the hashed environment information, and the evaluation value are registered in the environment information management DB 35a, the status change notifying section 36c transmits the entire information registered (in other words, the information of the user ID and the evaluation value) to the service provider terminal 20 as the status change information.

Figure 13:
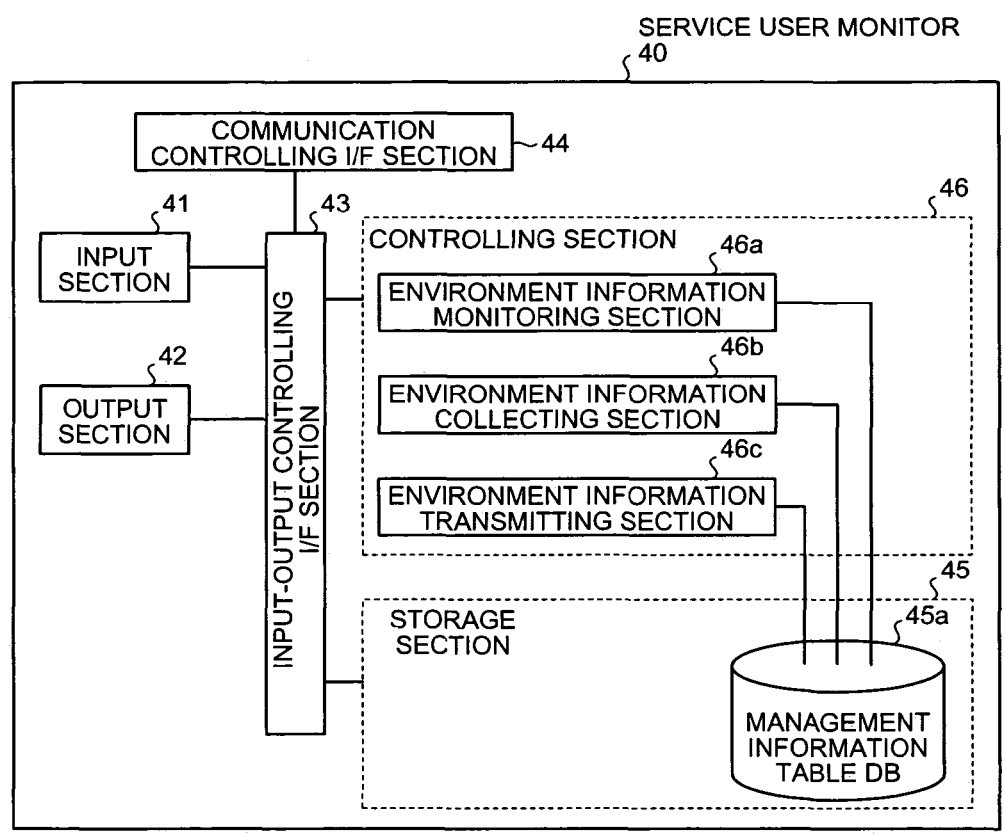
FIG. 13 is a block diagram of a service user terminal shown in FIG. 2.

FIG. 13 is a block diagram of the service user terminal 40. The service user terminal 40 includes an input section 41, an output section 42, an input-output controlling I/F section 43, a communication controlling I/F section 44, a storage section 45, and a controlling section 46.

The input section 41 is a means for inputting information and includes a key board, a mouse, and a microphone, and information associated with a request for service is input upon receiving from the service user. A monitor (the output section 42) that is described later, as well, realizes the function of the pointing device in cooperation with the mouse.

The output section 42 is a means for outputting information and includes a monitor (or a display and a touch panel) and a speaker. The output section 42 outputs contents provided by the service provider terminal 20. The input-output controlling I/F section 43 is a controlling unit that controls an input and an output of data to and from the input section 41 and the output section 42. The communication controlling I/F section 44 is a unit for controlling the communication mainly with the network operator terminal 30 and the service provider terminal 20 (may be via the network operator terminal 30).

The storage section 45 stores data and program necessary for various processes by the controlling section 46 and includes the management information table DB 45a as shown in FIG. 13 as data closely related to the present invention. The management information table DB 45a is a storage unit that stores temporarily the information associated with the environment of the service user terminal 40 (refer to FIG. 9).

The controlling section 46 includes an internal memory for storing a program and control data in which the processing procedure of each process is prescribed, and performs various processes accordingly. In particular, the controlling section 46 includes an environment information monitoring section 46a, an environment information collecting section 46b, and an environment information transmitting section 46c.

The environment information monitoring section 46a monitors the environment of the service user terminal 40 and when detects a change in the environment (when a software is installed newly or a hardware is connected newly), notifies the detection of the change in the environment to the environment information collecting section 46b.

The environment information collecting section 46b is a processing section that collects the environment information when the service user terminal 40 starts up, and registers the information collected in the management information table DB 45a. Moreover, the environment information collecting section 46b collects the environment information associated with a change in the environment when the change in the environment is notified by the environment information monitoring section 46a, and registers the environment information collected in the management information table DB 45a.

Furthermore, the environment information collecting section 46b, when receives a request for the environment information from the network operator terminal 30, makes a request to the environment information monitoring section 46a for a judgment of whether or not the environment of the local equipment is changed. When the environment of the local equipment is judged to have changed, the environment information collecting section 46b collects the information associated with the environment changed and registers the information collected in the management information table DB 45a.

The environment information transmitting section 46c is a processing section that transmits the environment information recorded in the management information table, according to the request of the network operator terminal 30. Concretely, the environment information transmitting section 46c reads the environment information from the management information table DB 45a, and transmits the environment information read and the hashed environment information to the network operator terminal 30. When the environment information monitoring section 46a detects the environment change of the local equipment and the environment information associated with the environment that is changed is registered in the management information table DB 45a by the environment information collecting section 46b, the environment information transmitting section 46c performs hashing of the environment information registered (environment information associated with the environment changed), and transmits to the network operator terminal 30.

Figure 14:
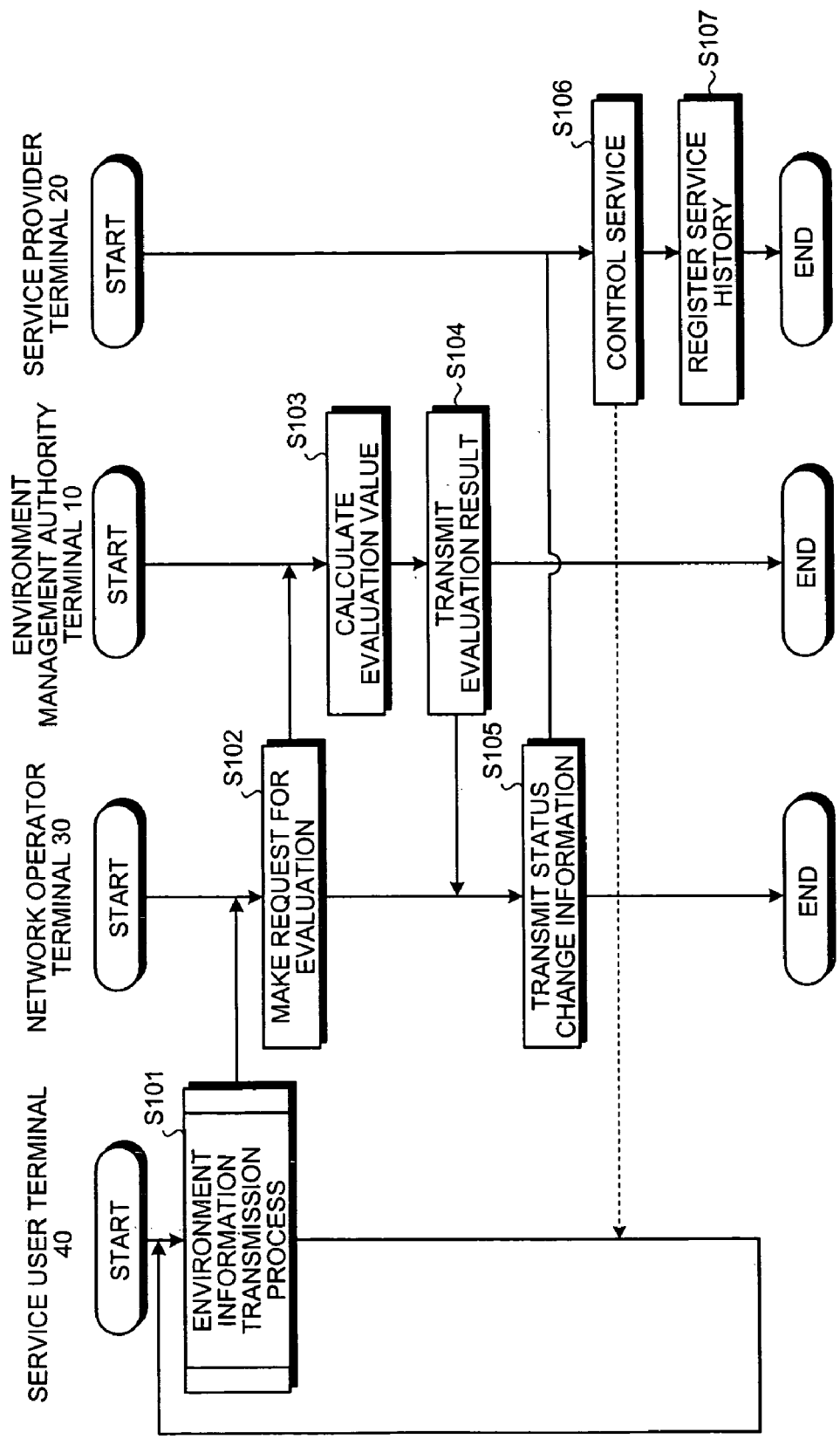
FIG. 14 is a flow chart of a process performed by the service controlling system according to the embodiment at the time of service control (when the service user terminal transmits environment information asynchronously)

Next a processing procedure at a time of service control (when the service user terminal 40 transmits the environment information asynchronously) by the service controlling system according to the embodiment is described. FIG. 14 is a flow chart of a process at a time of service control (when the service user terminal 40 transmits the environment information asynchronously) by the service controlling system according to the embodiment.

The service user terminal 40 transmits the hashed environment information to the network operator terminal 30 by performing an environment information transmitting process (step S101), the network operator terminal 30 makes a request to the environment management authority terminal 10 for the calculation of an evaluation value for the hashed environment information (step S102).

The environment management authority terminal 10 that has received the request for calculation, calculates the evaluation value by reading from the evaluation DB 15a an evaluation value corresponding to the hashed environment information (step S103). The evaluation value calculated is transmitted to the network operator terminal 30 (step S104).

Then, the network operator terminal 30 transmits to the service provider terminal 20 status change information that includes the user ID and the evaluation value associated with the environment information of the environment changed, and the service provider terminal 20 updates the user DB 25a (step S105).

The service provider terminal 20, when receives a request for a service from the service user terminal 40, refers to the user DB 25a and the service policy DB 25c and makes a judgment of whether the evaluation value associated with the service user terminal 40 fulfils a condition for providing the service. The service provider terminal 20 upon making the judgment controls a service that is to be provided to the service user terminal 40 (step S106).

Furthermore, the service provider terminal 20, after controlling the service, associates the user ID and the user name of the service user who has made the request for the service and registers in the service history DB 25d the service history that includes the date and time of service control, the service ID, the evaluation value used for the service control, and the result of the service control (step S107).

Figure 15:
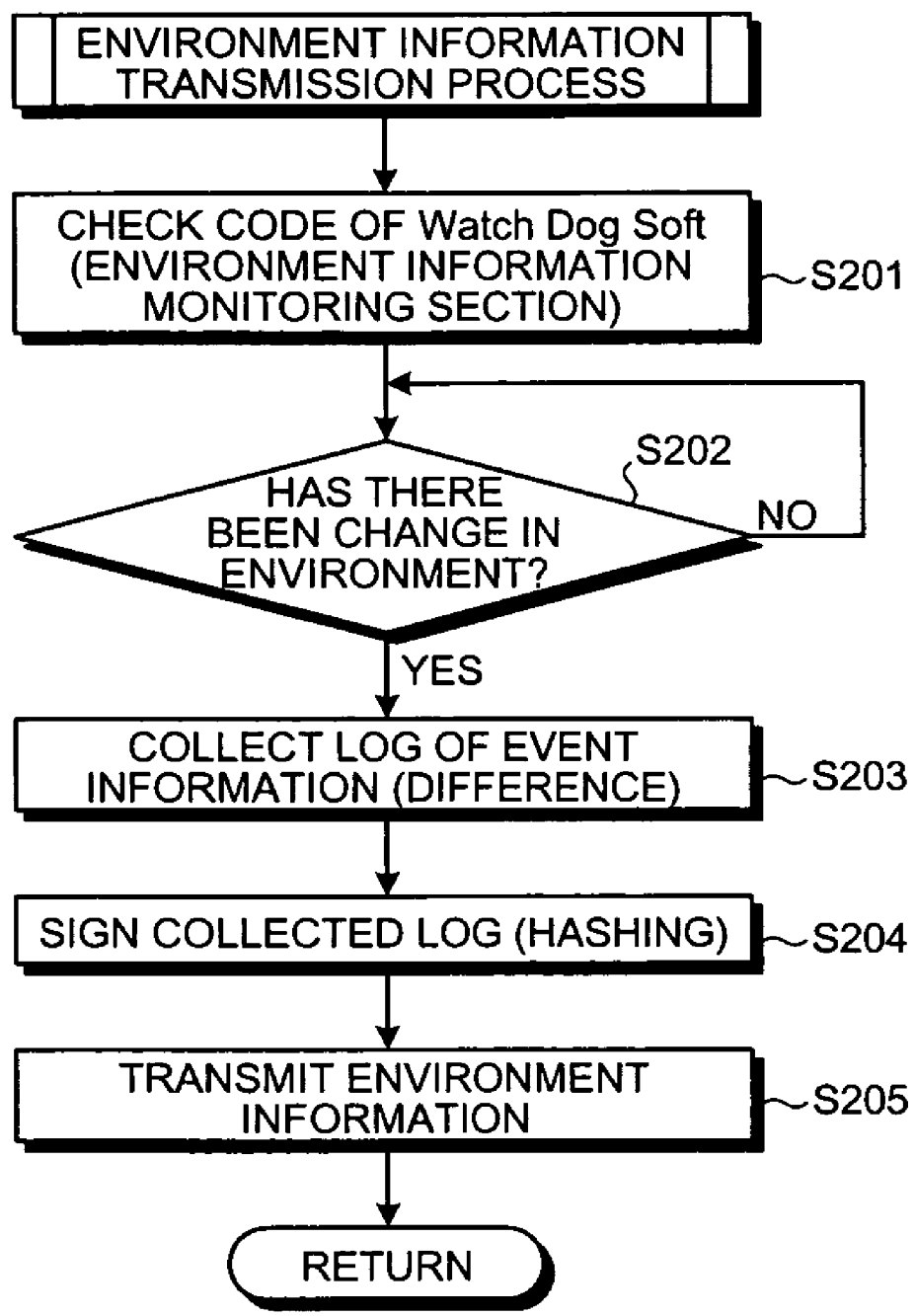
FIG. 15 is a flow chart of an environment information transmission process shown at step S101 in FIG. 14.

FIG. 15 is a flow chart of the environment information transmission process of step S101. In the environment information transmission process, the service user terminal 40 performs a code verification of the environment information monitoring section (that corresponds to a Watch Dog Software) 46a (step S201). As a result of the code verification, when the environment information monitoring section 46a is not normal, the service user terminal outputs an error to the output section 42.

Then, the environment information monitoring section 46a makes a judgment of whether the environment of the service user terminal 40 is changed or not. If the environment is not changed (No at step S202), the environment information monitoring section 46a continues monitoring (process moves to step S202). On the other hand, if the environment information monitoring section 46a makes a judgment of the environment being changed (Yes at step S202), the environment information monitoring section 46a notifies the occurrence of the change in the environment to the environment information collecting section 46b and the environment information collecting section 46b collects a log of event information (difference) (step S203). In other words, when the occurrence of the change in the environment is notified by the environment information monitoring section 46a, the environment information collecting section 46b collect from the management information table DB 45a only the environment information associated with the environment changed.

Further, the environment information transmitting section 46c performs signature (hashing) to the log collected (environment information associated with the environment changed) (step S204) and transmits the hashed environment information to the network operator terminal 30 (step S205). The service user terminal 40 terminates the environment information transmission process.

Thus, in the service controlling system, the service user terminal 40, when detects the environment change in the local equipment, transmits the environment information associated with the environment changed to the network operator terminal 30. After the network operator terminal 30 makes a request for evaluation to the environment management authority terminal 10, the network operator terminal 30 transmits the status information to the service provider terminal 20. The service provider terminal 20 updates the user DB and controls the service to be provided to the service user terminal. Therefore, it is possible to deal efficiently with the ever changing environment of the service user terminal 40 and to improve the reliability of providing the service.

Figure 16:
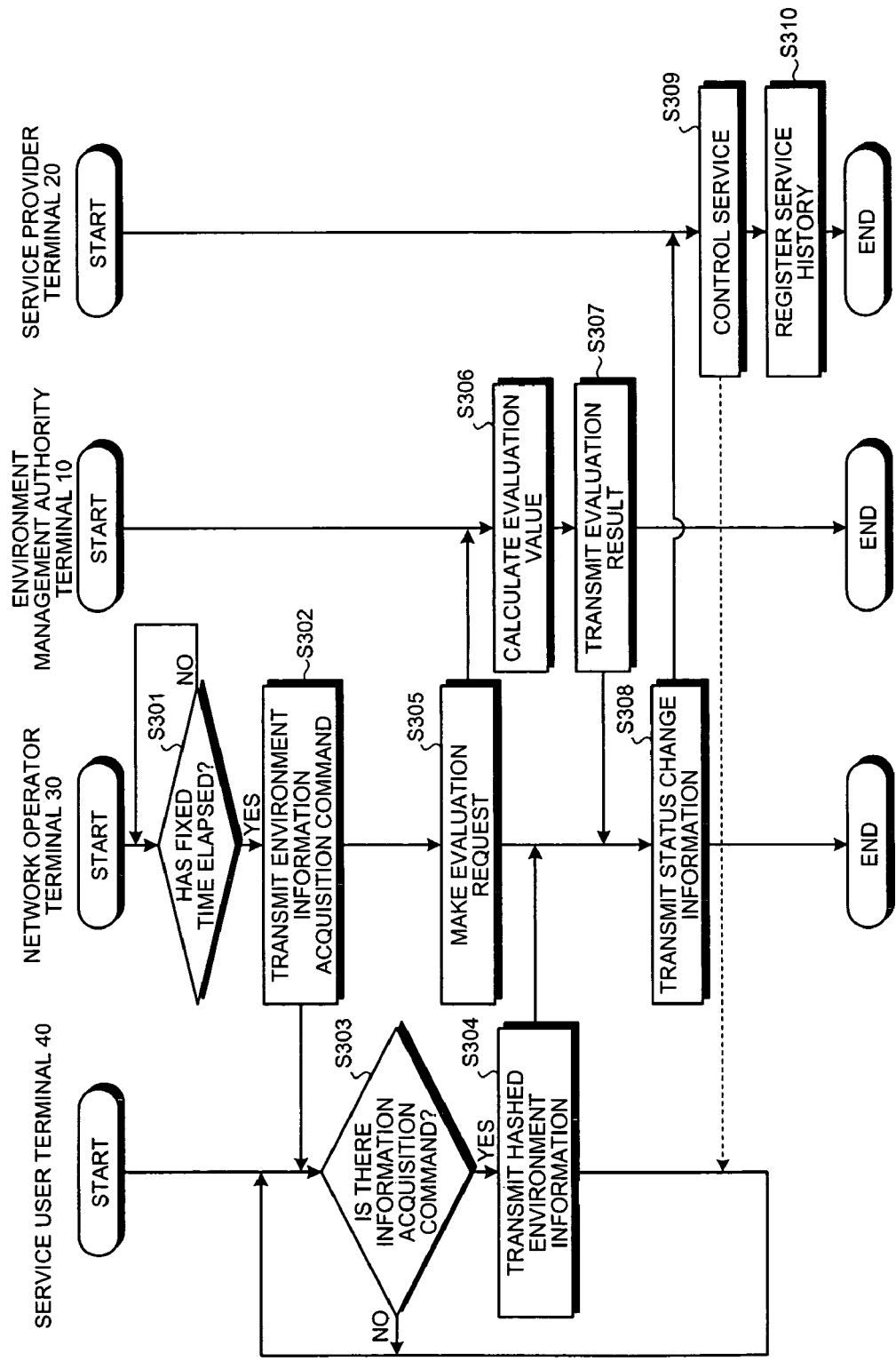
FIG. 16 is a flow chart of a process performed by the service controlling system according to the embodiment at the time of service control (when the network operator terminal makes a request for environment information-on periodic basis)

Next, a processing procedure at a time of the service control (when the network operator terminal 30 makes a request for environment information on periodic basis) by the service controlling system according to the embodiment is described. FIG. 16 is a flow chart of a process at the time of the service control (when the network operator terminal makes a request for environment information on periodic basis) in the service controlling system according to the embodiment.

The network operator terminal 30 counts time and makes a judgment of whether a certain fixed time has elapsed or not. If the certain fixed time has not elapsed (No at step S301), the network operator terminal 30 continues to count the time (the process moves once again to step S301). On the other hand, if the certain fixed time has elapsed (Yes at step S301), the network operator terminal 30 transmits to the service user terminal 40 an environment information acquisition command (step S302).

The service user terminal 40, from the network operator terminal 30, makes a judgment of whether the environment information acquisition command is acquired or not. If the environment information acquisition command is not acquired (No at step S303), the service user terminal 40 waits (process moves to step S303 once again). On the other hand, if the environment information acquisition command is acquired (Yes at step S303), the service user terminal 40 extracts a change in the environment and transmits hashed environment information associated with the environment changed, to the network operator terminal 30 (step S304).

Further, the network operator terminal 30 calculates an evaluation value for the hashed environment information and makes a request to the environment management authority terminal 10 (step S305). Upon receiving the request for evaluation, the environment management authority terminal 10 calculates the evaluation value by reading from the evaluation DB 15*a* an evaluation value for the hashed environment information (step S306), and transmits the evaluation value calculated to the network operator terminal 30 (step S307).

Then, the network operator terminal 30 transmits to the service provider terminal the status change information that includes the user ID and the evaluation value associated with the environment information of the environment changed. The service provider terminal 20 updates the user DB 25*a* (step S308).

Further, when the service provider terminal 20 receives a request for a service from the service user terminal 40, the service provider terminal 20 refers to the user DB 25*a* and the service policy DB 25*c* and upon making a judgment of whether or not the evaluation value associated with the service user terminal 40 fulfils a condition for providing the service, controls the service to be provided to the service user terminal 40 (step S309).

Further, the service provider terminal 20, after performing the service control, associates the user name and the user ID of the service user that made the request for the service and registers in the service history DB 25*d* the service history that includes the date and time of service control, the service ID, the evaluation value used for the service control and the result of performing the service control (step S310).

Thus, in the service controlling system, the network operator terminal 30 makes a request for the environment information to the service user terminal 40 on a periodic basis. The service user terminal 40 detects the environment change in the local equipment and transmits the environment information associated with the environment changed to the network operator terminal 30. The network operator terminal 30, after making a request for the evaluation value to environment management authority terminal 10, transmits the status information to the service provider terminal 20. The service provider terminal 20 updates the user DB and controls the service to be provided to the service user terminal 40. Therefore, it is possible to deal efficiently with the ever changing environment of the service user terminal 40 and to improve the reliability of providing the service.

Thus, in the service controlling system according to the embodiment, when the service user terminal 40 detects a change in the environment of the local equipment, the service controlling system extracts the environment information associated with the environment changed and transmits the hashed environment information to the network operator terminal 30. The network operator terminal 30 makes a request for the evaluation associated with the hashed environment information to environment management authority terminal 10. The environment management authority 10 calculates the evaluation value for the environment information and transmits the evaluation value calculated to the network operator terminal 30. The network operator terminal 30 transmits the status change information to the service provider terminal 20 and the service provider terminal 20 updates the user DB 25*a* and controls the service to be provided to the service user by referring to the user DB 25*a* and the service policy DB 25*c*. Therefore it is possible to deal with the environment change of the service user terminal 40 depending on the circumstances and to improve rapidly the reliability of providing the service.

In the embodiment, providing the service is controlled based on the environment information associated with the service user terminal 40. However, the present invention is not restricted to controlling providing the service based on the environment information associated with the service user terminal 40 and providing the service may be controlled by using environment information of the service provider terminal 20. In other words, monitoring processing unit that monitors the environment change is provided to the service provider terminal 20, and when the environment of the service provider terminal 20 changes, a request is made to environment management authority terminal 10 for an evaluation value for environment information associated with the environment changed, and the evaluation value is acquired. When a request for a service is received from the service user terminal 40, based on an evaluation value of the local equipment and the service policy DB, and the user DB, a judgment of whether or not the service is to be provided is made and the service control is performed, thereby improving further the reliability.

This is because, the environment of the service provider terminal 20 changes every moment due to upgrading of software etc. and there is a possibility of installing a software that may affect the service user terminal 40.

Figure 17:
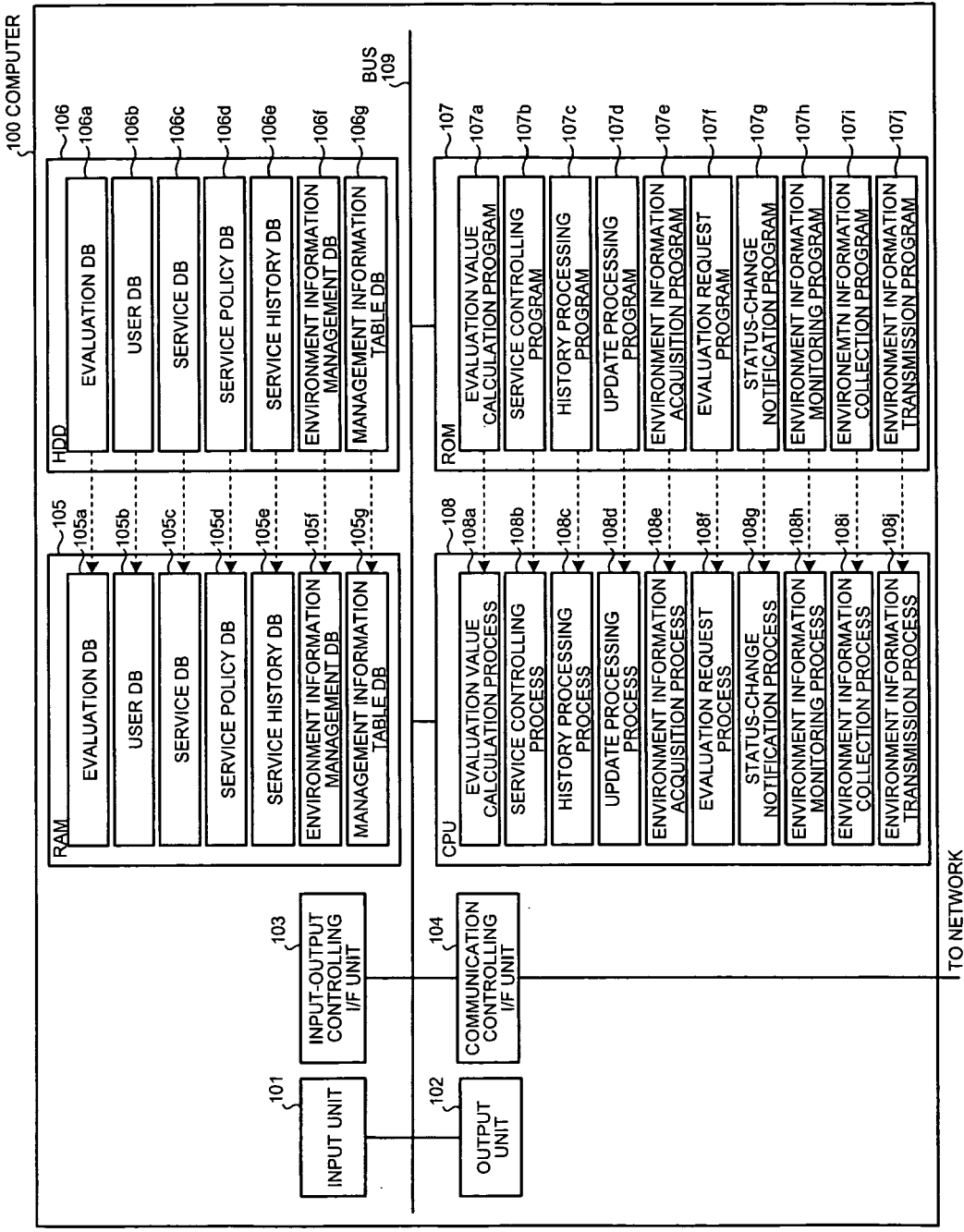
FIG. 17 is a diagram of a computer that implements the method according to the embodiment.

Incidentally, each process described so far can be realized by executing a computer program prepared in advance in a computer such as a personal computer and a work station. An example of a computer that executes a service controlling program that has a function similar to the embodiment is described below by referring to FIG. 17. FIG. 17 is a diagram of a computer 100 that executes the service controlling program.

The computer 100 includes an input unit 101, an output unit 102, an input-output controlling I/F section 103, a communication controlling I/F section 104, a RAM (random access memory) 105, an HDD (hard disc drive) 106, a ROM (read only memory) 107, and a CPU 108 that are connected by a bus 109. The input unit 101, the output unit 102, the input-output controlling I/F section 103, and the communication controlling I/F section 104 correspond to the input sections 11, 21, 31, and 41, the output sections 12, 22, 32, and 42, the input-output controlling I/F sections 13, 23, 33, and 43, and the communication controlling I/F sections 14, 24, 34, and 44 respectively shown in FIGS. 10 to 13.

When the computer 100 is an environment management authority terminal, an evaluation value calculation program 107a is recorded in advance in the ROM 107. The CPU 108 executes by reading the evaluation value calculation program 107a from the ROM 107. By execution of the evaluation value calculation program 107a by the CPU 108, the evaluation value calculation program 107a functions as an evaluation value calculation process 108a. The evaluation value calculation process 108a corresponds to the evaluation value calculating section 16a shown in FIG. 10. The CPU 108 calculates an evaluation value for the environment information by using an evaluation DB 105a (that corresponds to the evaluation DB 15a shown in FIG. 10) that is called in the RAM 105 from the HDD 106.

Moreover, when the computer 100 is a service provider terminal, a service controlling program 107b, a history processing program 107c, and an update processing program 107d are recorded in advance in the ROM 107. The CPU 108 reads and executes the computer programs 107b to 107d, and each of the programs 107b to 107d functions as a service controlling process 108b, a history processing process 108c, and an update processing process 108d respectively as shown in FIG. 17. Each of the processes 108b to 108d corresponds to the service controlling section 26a, the history processing section 26b, and the update processing section 26c respectively. The CPU 108 executes providing the service by using a service history DB 105e, a service policy DB 105d, a service DB 105c, and a user DB 105b that is read in the RAM 105 from the HDD 106 (each of the databases 105b to 105e corresponds to the user DB 25a, the service DB 25b, the service policy DB 25c, and the service history DB 25d respectively shown in FIG. 20).

Moreover, when the computer 100 is a network operator terminal, an environment information acquiring program 107e, an evaluation request making program 107f, and a status change notifying program 107g are recorded in advance in the ROM 107. The CPU 108 reads and executes the programs 107e to 107g and by execution of the computer programs 107e to 107g by the CPU 108, the computer programs 107e to 107g function as an environment information acquisition process 108e, an evaluation request making process 108f, and a status change notification process 108g. Each of the processes 108e to 108g corresponds to the environment information acquiring section 36a, the evaluation request making section 36b, and the status change notifying section 36c respectively shown in FIG. 12. The CPU 108 performs acquisition of the hashed environment information and transmits the evaluation request or the status change information by using an environment information DB 106f (corresponds to the environment information management DB 35a shown in FIG. 12) that is read in the RAM 105 from the HDD 106.

Moreover, when the computer 100 is a service user terminal, an environment information monitoring program 107h, an environment information collection program 107i, and an environment information transmission program 107j are recorded in advance in the ROM 107. The CPU reads and executes the programs 107h to 107j and by execution of the computer programs 107h to 107j by the CPU 108, the computer programs 107h to 107j function as an environment information monitoring process 108h, an environment information collection process 108i, and an environment informa-tion transmission process 108j respectively as shown in FIG. 17. Each of the processes 108h to 108j corresponds to the environment information monitoring section 46a, the environment information collecting section 46b, and the environment information transmitting section 46c shown in FIG. 13 respectively. The CPU 108 collects the environment information by using the management information table DB 45a (that corresponds to the management information table DB 45a shown in FIG. 13) that is read in the RAM 105 from the HDD 106.

Incidentally, each of the programs 107a to 107j need not be necessarily stored in the ROM 107 right from the beginning. Each of the programs 107a to 107j may be stored in a portable physical medium such as a flexible disc (FD), a CD-ROM (compact disc—read only memory), an MO disc, a DVD (digital versatile disc), a magneto-optical disc, an IC card, or a fixed physical medium such as a hard disc drive (HDD) that is provided internally or externally to the computer 100, or in other computer (or a server) that is connected to the computer 100 via a public line, the Internet, a LAN, and a WAN (wide area network). The computer may be allowed to execute upon reading each of the programs 107a to 107j from wherever the program is stored.

According to the present invention, an environment information transmission program detects a change in an environment associated with a terminal, then records information associated with the change in the environment detected in a recording unit, and then transmit the information associated with the change in the environment recorded in the recording unit to a controlling unit that controls providing of a service. Therefore, it is possible to transmit efficiently to the controlling unit the environment change associated with the terminal and to provide a suitable service to a service controlling unit.

According to the present invention, the environment information transmission program detects at regular time intervals a change in the environment associated with the terminal, then records in a recording unit the information associated with the change in the environment, and then transmits the information associated with the change in the environment recorded in the recording unit to the controlling unit that controls providing the service. Therefore, it is possible to transmit efficiently the environment change associated with the terminal to the controlling unit and to improve reliability of providing the service.

According to the present invention, the environment information transmission program, when receives from other unit a request for detecting the change in the environment associated with the terminal, detects the change in the environment associated with the terminal and records the information associated with the change in the environment that is detected in the recording unit and then transmits the information associated with the change in the environment that is stored in the recording unit to the controlling unit that controls the providing the service. Therefore, it is possible to transmit efficiently the environment change associated with the terminal to the controlling unit and to improve the reliability of providing the service.

According to the present invention, in an environment information transmission method, the change in the environment associated with the terminal is detected, then the change in the environment detected is recorded in the recording unit, and then information of the change in the environment recorded in the recording unit is transmitted to the controlling unit that controls the providing the service. Therefore, it is possible to transmit efficiently the environment change associated with the terminal to the controlling unit and to provide a suitable service to the service controlling unit.

According to the present invention, in the environment information transmission method, the change in the environment associated with the terminal is detected at regular time intervals, then information associated with the change in the environment that is detected is recorded in the recording unit, and then the information associated with the change in the environment recorded in the recording unit is transmitted to the controlling unit that controls providing the service. Therefore, it is possible to transmit efficiently the environment change associated with the terminal to the controlling unit and to improve the reliability of providing the service.

According to the present invention, in the environment information transmission program, when the request for detecting the change in the environment associated with the terminal is received from the other unit, the change in the environment associated with the terminal is detected and the information associated with the change in the environment that is detected is recorded in the recording unit, and then the information associated with the change in the environment that is recorded in the recording unit is transmitted to the controlling unit that controls providing the service. Therefore, it is possible to transmit efficiently the environment change associated with the terminal to the controlling unit and to improve the reliability of providing the service.

Moreover, according to the present invention, in a service controlling system, the change in the environment associated with user terminal is detected. Based on information associated with the change in the environment that is detected, the environment associated with user terminal is evaluated and an evaluation value is calculated. Based on the evaluation value, service to be provided to user terminal from the service provider terminal is controlled. Therefore, it is possible to deal with the ever changing environment of the user of the service and to improve the reliability of providing the service.

According to the present invention, in the service controlling system, the change in the environment associated with user terminal is detected at regular time intervals. Based on the information associated with the change in the environment that is detected, the environment associated with user terminal is evaluated and the evaluation value is calculated. Based on the evaluation value, the service to be provided to user terminal from the service provider terminal is controlled. Therefore, it is possible to deal with the ever changing environment of the user of the service and to improve the reliability of providing the service.

According to the present invention, in the service controlling system, when a request for detecting the change in the environment associated with user terminal is received from the network operator terminal that connects the service provider terminal and the user terminal, the change in the environment associated with user terminal is detected. Based on the information associated with the change in the environment that is detected, the environment associated with user terminal is evaluated and the evaluation value is calculated. Based on the evaluation value, the service to be provided to user terminal from the service provider terminal is controller. Therefore, it is possible to deal with the ever changing environment of the user of the service and to improve the reliability of providing the service.

According to the present invention, in the service controlling system, the change in the environment associated with user terminal and with the service provider terminal is detected. Information associated with the environment change of the service provider and the user is evaluated and the evaluation value of each terminal is calculated. Based on the evaluation value of the service provider terminal and user terminal, the service to be provided to user terminal from the service provider terminal is controlled. Therefore, it is possible to improve rapidly the reliability of providing the service.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable recording medium that stores therein a computer program that implements on a control terminal a method of providing information from a user terminal for a provider terminal, the computer program causing the control terminal to execute a process comprising:
   acquiring from the user terminal hashed environment information obtained by performing hashing of environment information that specifies software and hardware incorporated in the user terminal and detected as changed, and specifies hardware connected to the user terminal and detected as changed;
   converting the hashed environment information acquired at the acquiring into an evaluation value of the user terminal by which the provider terminal decides whether to provide a service to the user terminal; and
   causing the provider terminal to update a stored evaluation value of the user terminal by transmitting status change information including the evaluation value of the user terminal to the provider terminal.

2. The non-transitory computer-readable recording medium according to claim 1, wherein the acquiring includes making a request to the user terminal at regular intervals of time for the hashed environment information.

3. The non-transitory computer-readable recording medium according to claim 1, wherein the acquiring includes acquiring the hashed environment information upon receiving a request from other device.

4. The non-transitory computer-readable recording medium according to claim 1, further comprising storing, after the acquiring and before the causing, the hashed environment information in a storage unit.

5. A method of providing information from a user terminal for a provider terminal via a control terminal, the method including the control terminal performing:
   acquiring from the user terminal hashed environment information obtained by performing hashing of environment information that specifies software and hardware incorporated in the user terminal and detected as changed, and specifies hardware connected to the user terminal and detected as changed;
   converting the hashed environment information acquired at the acquiring into an evaluation value of the user terminal by which the provider terminal decides whether to provide a service to the user terminal; and
   causing the provider terminal to update a stored evaluation value of the user terminal by transmitting status change information including the evaluation value of the user terminal to the provider terminal.

6. The method according to claim 5, wherein the acquiring includes making a request to the user terminal at regular intervals of time for the hashed environment information.

7. The method according to claim 5, wherein the acquiring includes acquiring the hashed environment information upon receiving a request from other device.

8. The method according to claim 5, further comprising storing, after the acquiring and before the causing, the hashed environment information in a storage unit.

9. A method of providing a service for a user terminal via a control terminal, the method including:
- receiving status change information including an evaluation value of the user terminal from the control terminal that acquires from the user terminal hashed environment information obtained by performing hashing of environment information that specifies software and hardware incorporated in the user terminal and detected as changed, and specifies hardware connected to the user terminal and detected as changed, the evaluation value being converted from the hashed environment information;
- updating a stored evaluation value of the user terminal to obtain a new evaluation value of the user terminal, based on the status change information received; and
- determining whether to provide the service for the user terminal or not based on the new evaluation value of the user terminal.

10. A method of providing information about a user terminal for a provider terminal, the method including:
- acquiring from the user terminal hashed environment information obtained by performing hashing of environment information that specifies software and hardware incorporated in the user terminal and detected as changed, and specifies hardware connected to the user terminal and detected as changed;
- requesting a converting unit to calculate an evaluation value of the user terminal, the converting unit calculating the evaluation value by converting the hashed environment information into the evaluation value; and
- causing the provider terminal to update a stored evaluation value of the user terminal by transmitting status change information including the evaluation value of the user terminal calculated to the provider terminal.

11. A non-transitory computer-readable recording medium that stores therein a computer program that implements on a user terminal that receives a service provided by a provider terminal via the a control terminal, the computer program causing the user terminal to execute a process comprising:
- monitoring software and hardware incorporated in the user terminal, and hardware connected to the user terminal;
- hashing only environment information that specifies the software and the hardware in which a change is detected at the monitoring from among a plurality of environment information of the user terminal; and
- transmitting the hashed environment information to the control terminal that causes the provider terminal to update a stored evaluation value of the user terminal based on an evaluation value converted from the hashed environment information.

* * * * *